United States Patent
Yap et al.

(10) Patent No.: US 7,206,501 B2
(45) Date of Patent: Apr. 17, 2007

(54) METHOD AND APPARATUS FOR IDENTIFYING MPEG PICTURE CODING TYPES

(75) Inventors: Adrian Yap, Gaithersburg, MD (US); Scott Casavant, Germantown, MD (US)

(73) Assignee: The DirecTV Group, Inc., El Segundo, CA (US)

(*) Notice: Subject to any disclaimer, the term of this patent is extended or adjusted under 35 U.S.C. 154(b) by 1270 days.

(21) Appl. No.: 09/976,651

(22) Filed: Oct. 12, 2001

(65) Prior Publication Data

US 2003/0072555 A1  Apr. 17, 2003

(51) Int. Cl.
*H04N 7/26* (2006.01)

(52) U.S. Cl. .................................... 386/111

(58) Field of Classification Search ............... 386/68, 386/70, 46, 94, 111–112, 83; 725/31, 37, 725/40, 139–142, 109–110, 100, 131, 151; 718/100; 375/240.25, 240.26; 370/392, 370/396, 473
See application file for complete search history.

(56) References Cited

U.S. PATENT DOCUMENTS

| | | | | |
|---|---|---|---|---|
| 5,974,224 A | * | 10/1999 | Nagata | 386/109 |
| 6,289,164 B1 | * | 9/2001 | Hori et al. | 386/46 |
| 6,369,855 B1 | * | 4/2002 | Chauvel et al. | 348/423.1 |
| 6,510,554 B1 | * | 1/2003 | Gordon et al. | 725/90 |
| 7,035,335 B1 | * | 4/2006 | Iacobelli et al. | 375/240.25 |

FOREIGN PATENT DOCUMENTS

EP    910087 A2 *  4/1999

* cited by examiner

*Primary Examiner*—Thai Tran
*Assistant Examiner*—Mishawn Dunn
(74) *Attorney, Agent, or Firm*—Georgann S. Grunebach

(57) ABSTRACT

In a digital video recording system (DVR), a method of identifying the MPEG picture coding type of individual pictures of a GOP that is contained within a DSS transport packet, without parsing and evaluating each DSS transport packet. The picture coding type identifies whether a picture is an intra-coded (I) picture, predictive-coded (P) picture or bi-directionally predictive-coded (B) picture. The method facilitates implementation of DVR system playback modes, and especially trick modes by identifying and indexing the transport packet payload containing the I-picture (frame or field).

26 Claims, 8 Drawing Sheets

METHOD AND APPARATUS FOR IDENTIFYING MPEG PICTURE CODING TYPES

BACKGROUND OF THE INVENTION

1. Field of the Invention

This invention generally relates to digital recording, playing, and playback of previously recorded audiovisual (A/V) signals in a digital system. This invention more particularly relates to a method and apparatus for efficiently identifying MPEG picture coding types in DSS transport packets received in digital television or recording systems, without having to parse and evaluate each DSS transport packet.

2. Description of Related Art

Conventional communication systems exist for recording broadcast audiovisual signals. Particularly, various digital VCRs are known that record an off-air broadcast and later playback the previously recorded program. These conventional communications systems may include a receiver for receiving and processing transmitted waveforms. One type of receiver is part of a "wireless digital television" system known commercially by the trade name DSS. The DSS system, which is utilized by the DIRECTV broadcast service, allows consumers to receive directly in their homes over 175 television channels broadcast from a pair of powerful satellites.

The receiver includes a satellite dish connected by a cable to an integrated receiver/decoder unit (IRD), hereinafter set top box or STB. The satellite dish is aimed toward the satellites, and the STB is connected to the user's television in a similar fashion to a conventional cable-TV decoder.

On the transmission side, video, audio, and related information data signals are digitally encoded into a packetized data stream called a DSS transport stream using a number of algorithms, including convolutional error correction. The encoded data stream is then punctured to reduce bandwidth requirements, modulated to Ku-band frequency, transmitted to the satellite, and relayed from the satellite to the 18-inch satellite dish. The satellite dish shifts the Ku-band signal down to an L-band signal that is transmitted through the cable to the STB.

In the STB, front-end circuitry receives the L-band signal and converts it to the originally transmitted digital data stream of video, audio, and related information signals. The digital data stream is fed to video/audio circuitry such as transport processor and video/audio decoders that perform the main video/audio processing functions such as de-multiplexing and decompression. A micro-controller controls the overall operation of the STB, including the selection of parameters, the set-up and control of components, channel selection, viewer access to different programming packages, blocking certain channels, and many other functions. The compression and decompression of packetized video and audio signals may be accomplished according to the Motion Picture Expert Group (MPEG) standard for performing digital video/audio compression. Thus, the STB unit typically includes an MPEG-1 and/or MPEG-2 video/audio decoder in order to decompress the received compressed MPEG video/audio that is in the received DSS transport stream.

In general, digital video and audio signals can be broadcast, processed, and recorded with a high degree of quality. In order to take better advantage of the high quality associated with digital video/audio, digitally-based peripheral devices, such as digital video cassette recorders (DVCR's) and digital video disks (DVD's), have been developed to receive and process video/audio in a digital format. The present invention relates to a method and apparatus for receiving broadcast entertainment-type data, such as packetized digital video, audio, data, and control signals received in a direct broadcast satellite (DBS) system, and for effectively recording the received data on a device such as a digital video recorder (DVR).

Within these packetized transport streams resides data that, when de-multiplexed at the STB, transforms into a group of pictures, or GOP. A GOP consists of coded pictures. A coded picture may be a frame or field. For progressive video, a picture is identical to a frame while for interlaced video; a picture refers to a frame, or the top field or the bottom field. A typical GOP may contain one I-picture, which is the anchor picture or intra-coded picture of the GOP, in 15 pictures of video. The P-pictures are single directional predictive pictures which are dependent on the I picture (i.e., the P pictures typically show changes in the basic overall image, like cloud cover changes in an image of a city skyline, for example). The B pictures are bi-directional pictures that provide for high compression (they have the highest compression ratio in the GOP). For example, a typical GOP may include I, P and B pictures in some order, such as I B B P B B P B B P B B P B B. These are actually different pictures of a subject image, hence group of pictures or GOP.

Current digital video recorders (DVRs) include some type of transport processor to process the received DSS transport packets from any of a cable, satellite, video-on-demand or other commercial video source. Known as a transport packet processor or simply "transport processor", this processor must be able to identify the presence of a picture coding type, in order to facilitate DVR playback modes, and especially trick modes. This is because to initiate trick modes such as fast rewind, reverse playback, fast forward, instant replay, slow motion and frame-by-frame (or field-by-field) display for example, all I-pictures of a particular sequence must be identified. Picture coding type identifies whether a picture is an intra-coded (I) picture or predictive coded (P) picture or bi-directionally predictive coded (B) picture.

In order to do this today, current transport processors must parse and evaluate every bit in each received transport packet payload to determine the presence of a picture start code, which is a string of 32 bits that are set to (00 00 01 00$_h$). This is both time-consuming and unnecessary, and is a substantial drain on processing power. Once the picture start code is detected, only then will the transport processor evaluate and identify the picture coding type.

As noted, this individual parsing and evaluating of each bit in each transport packet payload unduly delays programming, causes user frustration, and places an unnecessary burden on the processing capability of the DVR system. Therefore, what is desired is a method and apparatus for identifying the MPEG picture coding type without having to parse and evaluate each bit in each DSS transport packet.

SUMMARY OF THE INVENTION

The present invention provides a method of identifying the MPEG picture coding type of individual pictures of a GOP that is contained within a DSS transport packet, without parsing and evaluating each DSS transport packet. The picture coding type identifies whether a picture is an intra-coded (I) picture, predictive-coded (P) picture or bi-directionally predictive-coded (B) picture.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, wherein like elements are represented by like reference numerals, which are given by way of illustration only and thus are not limitative of the present invention and wherein.

DETAILED DESCRIPTION

Figure 1:
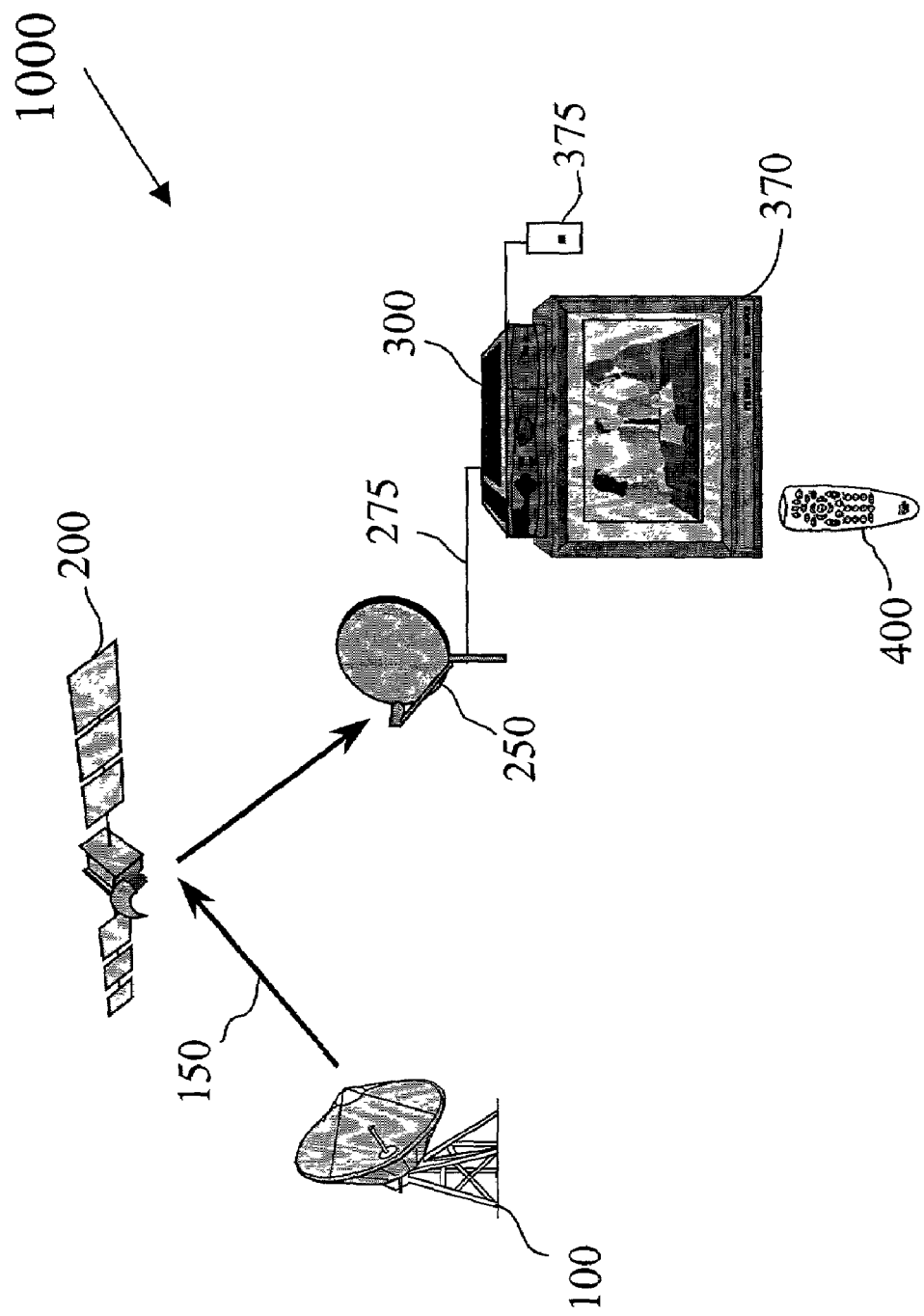
FIG. 1 is an exemplary arrangement of a digital video recorder-equipped (DVR) set-top box (STB) of a direct broadcast satellite or digital video broadcast system.

The present invention makes it possible to efficiently identify the MPEG picture coding type without parsing and evaluating every DSS transport packet. The picture coding type identifies whether a picture is an intra-coded (I) picture, predictive-coded (P) picture or bi-directionally predictive-coded (B) picture. Quickly identifying picture coding type is useful for DVR (digital video recording) applications. These devices allow a user to digitally record a broadcast on a hard drive. In order to facilitate DVR playback modes, and especially trick modes, the transport packet payload containing the I-picture (frame or field) must be identified and indexed, since the leading I-picture in a GOP is to be decompressed first. Any P-pictures and B-pictures following the I-picture in a GOP cannot be successfully decoded prior to decoding the leading I-picture. Examples of trick modes includes fast rewind, reverse playback, fast forward, instant replay, slow motion and frame-by-frame display.

The DSS transport protocol format defines a 130-byte packet containing a Prefix and Transport Block. The first two bytes of the 130-byte long packet are used for the Prefix, the third byte contains four bits for the Continuity Counter (CC) and four bits for a Header Designator (HD) while the remaining 127 bytes carry the payload. A transport packet with HD field set to $01X0_b$ contains Basic Video Service (MPEG video data) information. The $HD_1$ bit, indicated by X in $HD=01X0_b$, toggles with each Basic Video Service packet containing a picture start code.

When the $HD_1$ bit toggles, the picture start code is represented by the first 32 bits of that particular transport packet payload being processed by the transport processor at the time of toggle. The picture coding type is represented by the $11^{th}$, $12^{th}$, and $13^{th}$ bits from the end of the picture start code. In other words, when the $HD_1$ bit toggles, the picture coding type is represented by the $43^{rd}$, $44^{th}$ and $45^{th}$ bits of that particular DSS transport packet payload. Hence, it is sufficient to evaluate only the $43^{rd}$, $44^{th}$ and $45^{th}$ bits of a transport packet payload when the $HD_1$ bit toggles in order to determine whether it is an I-picture, a P-picture or B-picture. This saves significant processing power, which may then be dedicated to another function of the transport processor, encryption and decryption of received packets.

Without the method of the present invention, current processors are required to evaluate each bit in each DSS transport packet payload to determine the presence of a picture start code ($00\ 00\ 01\ 00_h$). Once the picture start code is detected, only then would the processor be able to evaluate and identify the picture coding type. This means that it takes longer to identify the packet whose payload contains the I-frame or I-field that has the picture start code. Hence, there is a delay in the initiation of playback modes in the DVR, especially trick modes, and a greater burden on the transport processor.

This invention makes it possible to identify the picture coding type (I, P or B-picture) without parsing and processing each bit in every DSS transport packet, and is applicable to future recording systems such as TiVo, Replay TV and/or cable/satellite video-on-demand (VOD) products in the future. However, before describing the above features in greater detail, the inventors initially offer a general discussion on a set-top box (STB) equipped with a digital video recorder (DVR) within a direct broadcast satellite or digital video broadcast (DVB) system. Additionally, the basic architecture and operation of the STB is explained in order to provide a context for the method of the present invention.

In general, television signal distribution systems generally rely on either a cable network or on free-space propagation for delivering television signals to individual users or subscribers. Cable-based television systems transmit one or more individual television signals or "channels" over wire, while free-space propagation systems transmit one or more channels over-the-air, i.e., in a wireless manner. Most large-scale cable and wireless television signal distribution systems broadcast a broadband television signal having a plurality of individual television signals or channels modulated onto one or more carrier frequencies within a discernable frequency band.

Some wireless television signal distribution systems use one or more geo-synchronous satellites to broadcast a broadband television signal to receiver units within a large geographic area, while other wireless systems are land-based, using one or more transmitters located within smaller geographic areas to broadcast to individual receiver units within those geographic areas. An example of a land-based "cellular" type television signal distribution system is disclosed in Bossard, U.S. Pat. No. 4,747,160. This system includes multiple television signal transmitting stations, each of which transmits a television signal to individual receivers spread throughout a limited geographic region, and is configured so that adjacent transmitting stations use modulation and frequency diversity to prevent interference.

Some cellular systems, such as those commonly referred to as LMDS (local multi-point distribution system) and MMDS (multi-channel, multi-point distribution system), use a land-based cellular-type transmitting setup to rebroadcast satellite signals at frequencies different than the frequencies used by the satellite. Each of the transmitters of an LMDS system typically transmits within a one to five mile radius cell while each of the transmitters of an MMDS system typically transmits within an approximately 30-mile radius cell.

The present invention may be embodied in a satellite-based distribution system. The system generally includes an earth station that compiles a number of programs (video and audio) into a broadband signal, modulates a carrier frequency band with the broadband signal and then transmits (uplinks) the modulated signal to a geo-synchronous satellite via a transmit antenna. The satellite amplifies the received signal, shifts the signal to a different carrier frequency band and transmits (downlinks) the frequency-shifted signal to earth for reception at individual receiver stations.

The uplink and downlink broadband signals of the disclosed satellite distribution system may be divided into a plurality of transponder signals, each having a plurality of individual channels. For example, analog satellite systems operating in the so-called "G-band," i.e., between about 3.7 GHz and about 4.2 GHz, typically broadcast ten (10)–500 MHz-wide transponder signals, with each transponder signal further including twelve, 40 MHz-wide analog channels. Satellite systems may also broadcast a set of transponder signals at multiple polarizations, for example, a right-hand circular polarization (PHCP) and a left-hand circular polarization (LHCP), within the band of carrier frequencies associated with the satellite; effectively doubling the number of channels broadcast by the system.

Satellite-based signal distribution systems exist for many frequency bands, including the so-called "Ku-band" which ranges from approximately 12 GHz to approximately 18 GHz. The preferred embodiment of the present invention uses an uplink signal having 16 RHCP transponder signals and 16 LHCP transponder signals modulated into the frequency band between about 17.2 GHz and about 17.7 GHz. Each of these 32 transponder signals includes data packets related to approximately 10 individual television channels associated therewith. The satellites shift the uplink transponder signals to carrier frequencies ranging from approximately 11.7 GHz to approximately 12.2 GHz and transmit these frequency-shifted transponder signals back to earth for reception at each of a plurality of individual receiver stations.

Each receiver station may include an antenna coupled to a set top box (STB) that is equipped with a digital video recorder (DVR). In another embodiment, the STB may have interface circuitry coupled thereto for connection to an external digital peripheral unit such as a storage medium.

The antenna may comprise a parabolic dish antenna such as an outdoor unit (ODU) for example, pointed in the general direction of the transmitting satellite (or other transmitting location) to thereby receive the broadband signal. Such antennas may also include a low-noise block (LNB) downconverter, which filters and shifts the incoming signal to an intermediate frequency band, such as L-band, which is between approximately 1.0 GHz and approximately 2.0 GHz. In one embodiment, the signal received from the satellite is shifted to the frequency band between approximately 950 MHz and approximately 1450 MHz.

Sometimes, only the RHCP transponder signals or the LHCP transponder signals are mixed down to L-band, depending on which channel a user is viewing. However, in systems having a two-channel LNB downconverter, both the RHCP and the LHCP transponder signals are shifted down to L-band and provided, via separate lines, to the receiver station.

However, before describing the method of identifying MPEG picture coding types in greater detail, the inventors initially offer a general discussion on a set-top box (STB) equipped with a digital video recorder (DVR) within a direct broadcast satellite or digital video broadcast (DVB) system. Additionally, the basic architecture and operation of the STB-equipped with DVR is explained in order to provide a context for the method of identifying MPEG picture coding types in accordance with the invention.

FIG. 1 is an exemplary arrangement of a set-top box (STB) 300 equipped with a digital video recorder (DVR) within a direct broadcast satellite or digital video broadcast (DVB) system, in accordance with the method and apparatus of the present invention. In the exemplary embodiment of FIG. 1, the system 1000 may comprise a transmit antenna station 100, satellite 200, receive antenna 250 and STB 300.

The transmit antenna station may be a DIRECTV™ satellite uplink facility, for example, or any other earth station as described above and which is well known in the art. The bitstream 150 is a digital audio and video television data (A/V signal), the medium is a satellite 200, and the receive antenna 250 is preferably an outdoor unit (ODU). As illustrated in FIG. 1, the ODU is connected to a set-top box (hereinafter STB) 300 via coaxial cable 275. In this exemplary embodiment, the DVR of the present invention is included in, or subsumed within the STB 300. STB 300 may further be connected to a display 370, such as a standard definition television, a high definition television or a PC monitor and also may be connected to a telephone line 375. The DVR-equipped STB 300 may be controlled via a remote control 400.

Figure 2:
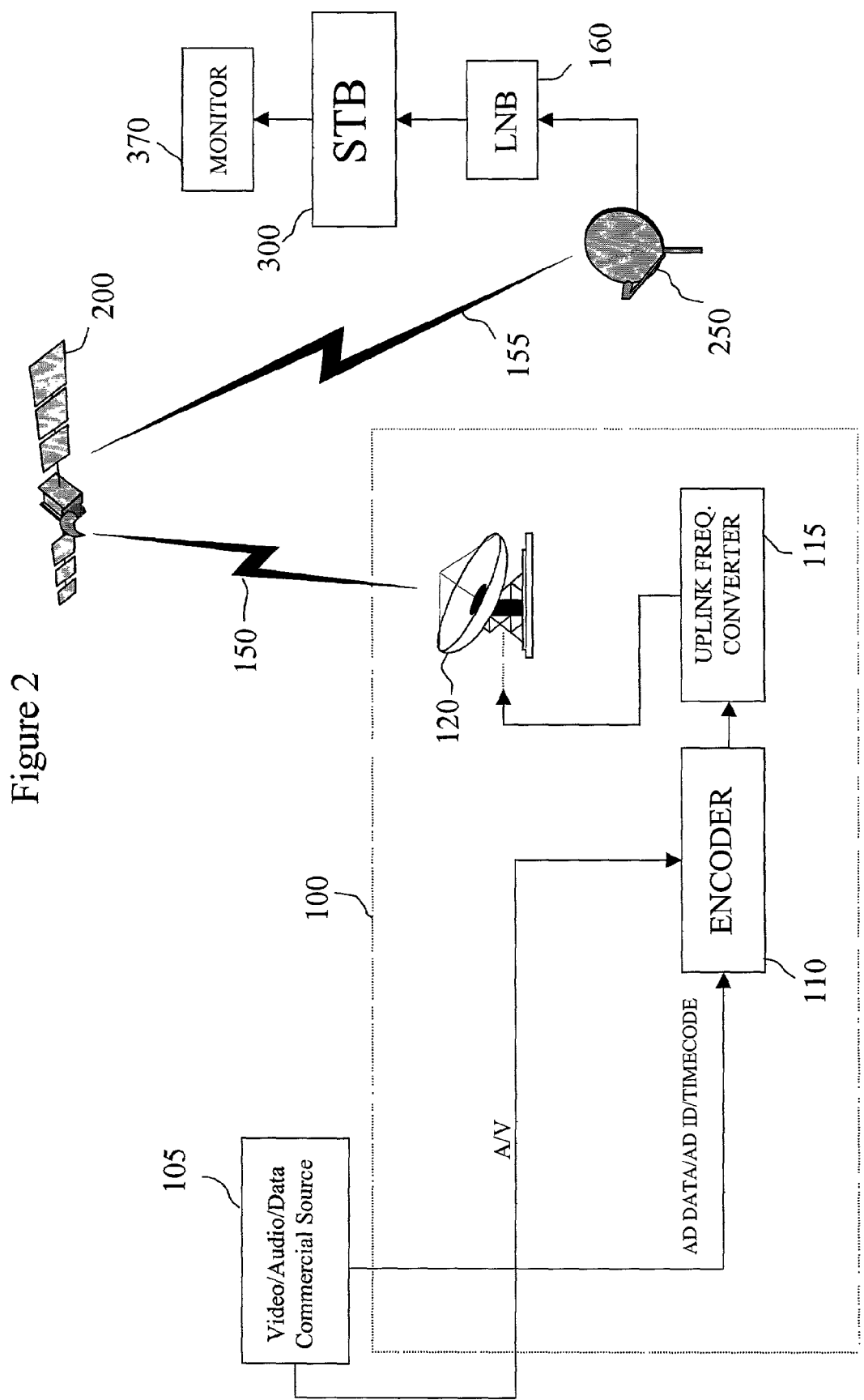
FIG. 2 illustrates a general data flow in a direct broadcast satellite or digital video broadcast system.

FIG. 2 illustrates the general data flow in a direct broadcast satellite or digital video broadcast system. In operation, the transmit antenna station 100 (hereinafter referred to as uplink facility 100 for clarity) can receive video and audio programming from a number of sources, including satellites, terrestrial fiber optics, cable, or tape. Preferably, the received programming signals, along with data signals such as electronic scheduling data and conditional access data, are sent from some commercial source 105 to a video/audio/data encoding system 110 within uplink facility 100. Here, they are digitally encoded and multiplexed into a packetized data stream using a number of conventional algorithms, including convolution error correction and compression, for example.

In a conventional manner, the encoded data stream is modulated and sent through an uplink frequency converter 115 which converts the modulated encoded data stream to a frequency band suitable for reception by the satellite 200. Preferably, the satellite frequency is K-band such as in the Ku-band; however the frequency may be in the Ka band as well. The modulated, encoded data stream is then routed from the uplink frequency converter 115 to an uplink satellite antenna/dish 120, where it is broadcast toward the satellite 200 over the airlink 150. The satellite 200 receives the modulated, encoded Ku-band data stream via downlink 155, and re-broadcasts it downward toward an area on earth that includes the various receiver stations (STB 300, for example). In this embodiment, the satellite dish (ODU 250) of STB 300 shifts the Ku-band signal down to an L-band signal which is transmitted via a LNB downconverter 160 to STB 300, for eventual reproduction on display monitor 370.

Front-end circuitry, which may or may not be part of STB 300, receives the L-band RF signals from the LNB 160 and converts them back into the original digital data stream. The front-end circuitry may include a tuner. Circuitry (shown and explained in more detail in FIG. 3) receives the original data streams via an input port and performs video/audio processing operations such as de-multiplexing and decompression. A microprocessor (host processor) controls the overall operation of STB 300, including the selection of parameters, the set-up and control of components, channel selection, a user's access to different program packages, and many other functions.

Figure 3:
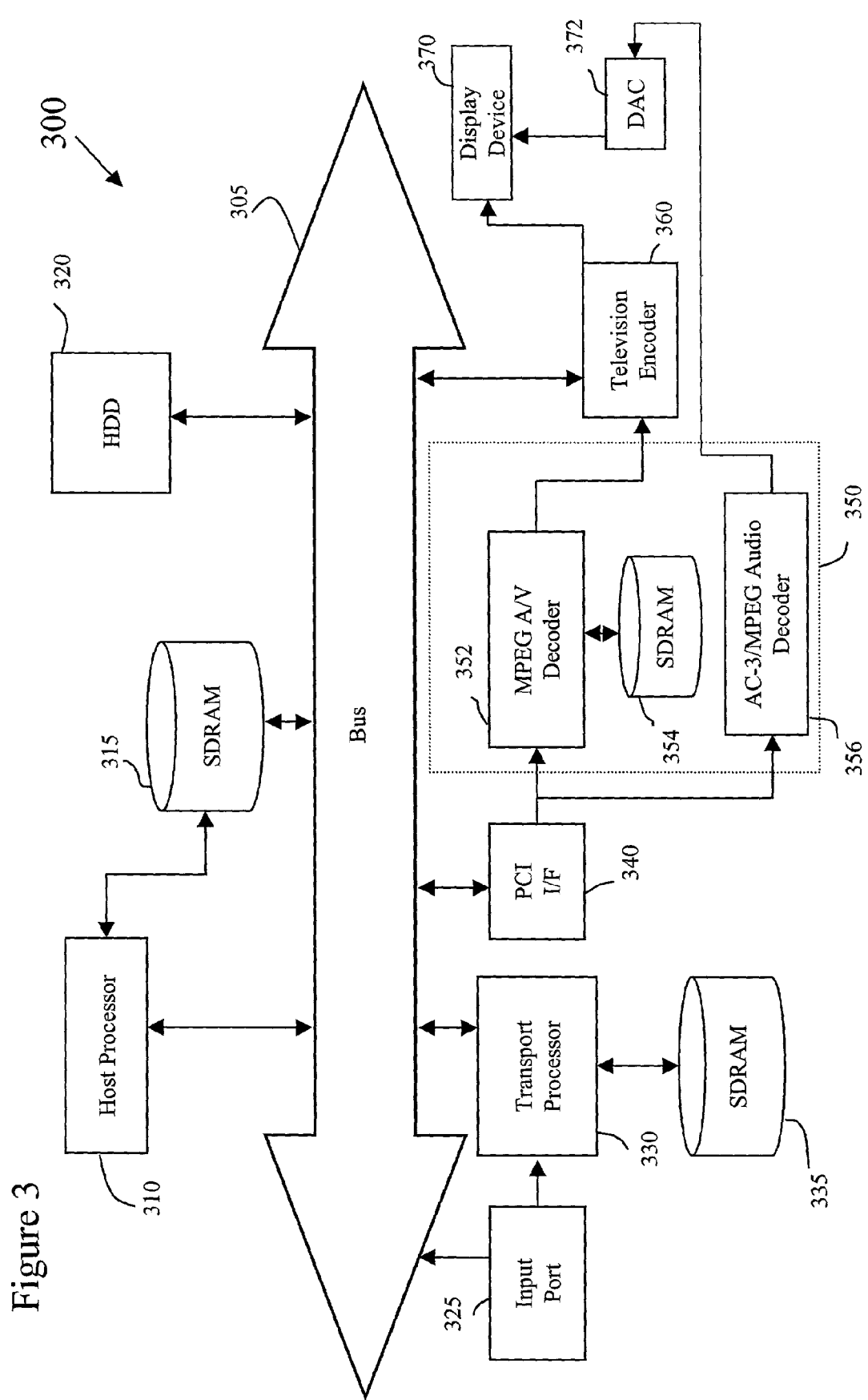
FIG. 3 is a block diagram of an exemplary architecture of the DVR-equipped STB of the present invention.

FIG. 3 illustrates an exemplary architecture of the DVR-equipped STB 300 that is capable of performing background caching and HDD storing of encrypted programming for later playback in accordance with the present invention. The STB 300 utilizes a bus 305 to interconnect various components and to provide a pathway for data and control signals.

FIG. 3 illustrates a host processor 310, a memory device 315 (in an exemplary configuration embodied as an SDRAM 315) and a hard disc drive (HDD) 320 connected to the bus 305. The host processor 310 may also have a direct connection to SDRAM 315 as shown in FIG. 3.

As further shown in FIG. 3, a transport processor 330 and PCI I/F 340 (peripheral component interconnect interface) are connected to the bus 305. The transport processor 330 also has a connection to input port 325 and SDRAM 335. Furthermore, the PCI I/F 340 is connected to a decoder 350. The decoder 350 is connected to a television encoder 360. The output of television encoder 360 is in turn sent to a display device 370. Decoder 350 may include both an MPEG A/V decoder 352 and an AC-3/MPEG audio decoder 356, the output of the latter being sent to display device 370 after conversion in a digital-to-analog converter (DAC) 372.

The host processor 310 may be constructed with conventional microprocessors such as the currently available Pentium™ processors from Intel. Host processor 310 performs real-time and non real-time functions in the STB 300, such as graphics-user interface and browser functions.

HDD 320 is actually a specific example of a mass storage device. In other words, the HDD 320 may be replaced with other mass storage devices as is generally known in the art, such as known magnetic and/or optical storage devices, (i.e., embodied as RAM, a recordable CD, a flash card, memory stick, etc.). In an exemplary configuration, HDD 320 may have a capacity of at least about 25 Gbytes, where preferably about at least 20 Gbytes is available for various recording applications, and the remainder flexibly allocated for pause applications in STB 300.

The bus 305 may be implemented with conventional bus architectures such as a peripheral component interconnect (PCI) bus that is standard in many computer architectures. Alternative bus architectures could, of course, be utilized to implement bus 305.

The transport processor 330 performs real-time functions and operations such as conditional access, program guide control, etc., and may be constructed with an ASIC (application specific integrated circuit) that contains, for example, a general purpose R3000A MIPS RISC core, with sufficient on-chip instruction cache and data cache memory. Furthermore, the transport processor 330 may integrate system peripherals such as interrupt, timer, and memory controllers on-chip, including ROM, SDRAM, DMA controllers; a packet processor, crypto-logic, PCI compliant PC port, and parallel inputs and outputs. The implementation shown in FIG. 3 actually shows the SDRAM 335 as being separate from the transport processor 330, it being understood that the SDRAM 335 may be dispensed with altogether or consolidated with SDRAM 315. In other words, the SDRAMs 315 and 335 need not be separate devices and can be consolidated into a single SDRAM or other memory device.

The input port 325 receives audiovisual bitstreams that may include, for example, MPEG-1 and/or MPEG-2 video bitstreams, MPEG-1 layer II audio bitstreams and Dolby digital (AC-3) audio bitstreams. Additionally, the present application is not limited to a single input port 325 as the STB 300 may receive audiovisual bitstreams via a plurality of input ports 125.

Exemplary A/V bitrates may range from about 60 Kbps to 15 Mbps for MPEG video, from about 56–384 Kbps for MPEG audio, and between about 32–448 Kbps for AC-3 audio. The single-stream maximum bitrate for STB 300 may correspond to the maximum bitrate of the input programming, for example 16 Mbps or 2 MBps, which corresponds to the maximum MPEG-2 video bitrate of 15 Mbps, maximum MPEG-1 Layer-2 audio bitrate of 384 kbps, and maximum AC-3 bitrate of 448 kbps.

Of course, various other audiovisual bitstream formats and encodation techniques may be utilized in recording. For example, STB 300 may record an AC-3 bitstream, if AC-3 broadcast is present, along with MPEG-1 digital audio. Still further, the received audiovisual data may be encrypted and encoded or not encrypted and encoded. If the audiovisual data input via the input port 325 to the transport processor 330 is encrypted, then the transport processor 330 may perform decryption. Moreover, the host processor 310 may perform the decryption instead.

Alternatively, the host processor 310 and transport processor 330 may be integrated or otherwise replaced with a single processor. As mentioned above, the SDRAMs (315 and 335) may be consolidated or replaced with a single SDRAM or single memory device.

The PCI I/F 340 may be constructed with an ASIC that controls data reads from memory. Audiovisual (A/V) data may be sent to the host processor 310's memory and eventually stored in HDD while simultaneously being sent to an MPEG A/V decoder 352, as further discussed below.

As previously noted, decoder 350 may be constructed as shown in FIG. 3 by including the MPEG A/V decoder 352 connected to the PCI I/F 340, as well as an AC-3/MPEG audio decoder 356 which is also connected to the PCI I/F 340. In this way, decoders 352 and 356 can separately decode the video and audio bitstreams from the PCI I/F 340, respectively. Alternatively, a consolidated decoder may be utilized that decodes both video and audio bitstreams together. As mentioned above, the encodation techniques are not limited to MPEG and AC-3 and can include any known or future developed encodation technique. In a corresponding manner, the decoder 350 could be constructed to process the selected encodation technique(s) utilized by the particular implementation desired.

In order to more efficiently decode the MPEG bitstream, the MPEG A/V decoder 352 may also include a memory device such as SDRAM 354 connected thereto. This SDRAM 354 may be eliminated, consolidated with decoder 352 or consolidated with the other SDRAMs 315 and/or 335.

Television encoder 360 is preferably an NTSC encoder that encodes, or converts the digital video output from decoder 350 into a coded analog signal for display. Regarding the specifications of the NTSC (National Television Standards Committee) encoder 360, the NTSC is responsible for setting television and video standards in the United States. The NTSC standard for television defines a composite video signal with a refresh rate of 60 half-frames (interlaced) per second. Each frame contains 525 lines and can contain 16 million different colors.

In Europe and the rest of the world, the dominant television standards are PAL (Phase Alternating Line) and SECAM (Sequential Color with Memory). Whereas NTSC delivers 525 lines of resolution at 60 half-frames per second, PAL delivers 625 lines at 50 half-frames per second. Many video adapters or encoders that enable computer monitors to be used as television screens support both NTSC and PAL signals. SECAM uses the same bandwidth as PAL but transmits the color information sequentially. SECAM runs on 625 lines/frame.

Thus, although use of NTSC encoder 360 is envisioned to encode the processed video for display on display device 370, the present invention is not limited to this standard encoder. PAL and SECAM encoders may also be utilized. Further, hi-definition television (HDTV) encoders may also be viable to encode the processed video for display on a HDTV, for example.

Display device 370 may be an analog or digital output device capable of handling a digital, decoded output from the television encoder 360. If analog output device(s) are desired, to listen to the output of the AC-3/MPEG audio decoder 356, a digital-to-analog converter (DAC) 372 is connected to the decoder 350. The output from DAC 372 is an analog sound output to display device 370, which may be a conventional television, computer monitor screen, portable display device or other display devices that are known and used in the art. If the output of the AC-3/MPEG audio decoder 356 is to be decoded by an external audio component, a digital audio output interface (not shown) may be included between the AC-3/MPEG audio decoder 356 and display device 370. The interface may be a standard interface known in the art such as a SPDIF audio output interface, for example, and may be used with, or in place of DAC 372, depending on whether the output devices are analog and/or digital display devices.

Figure 4:
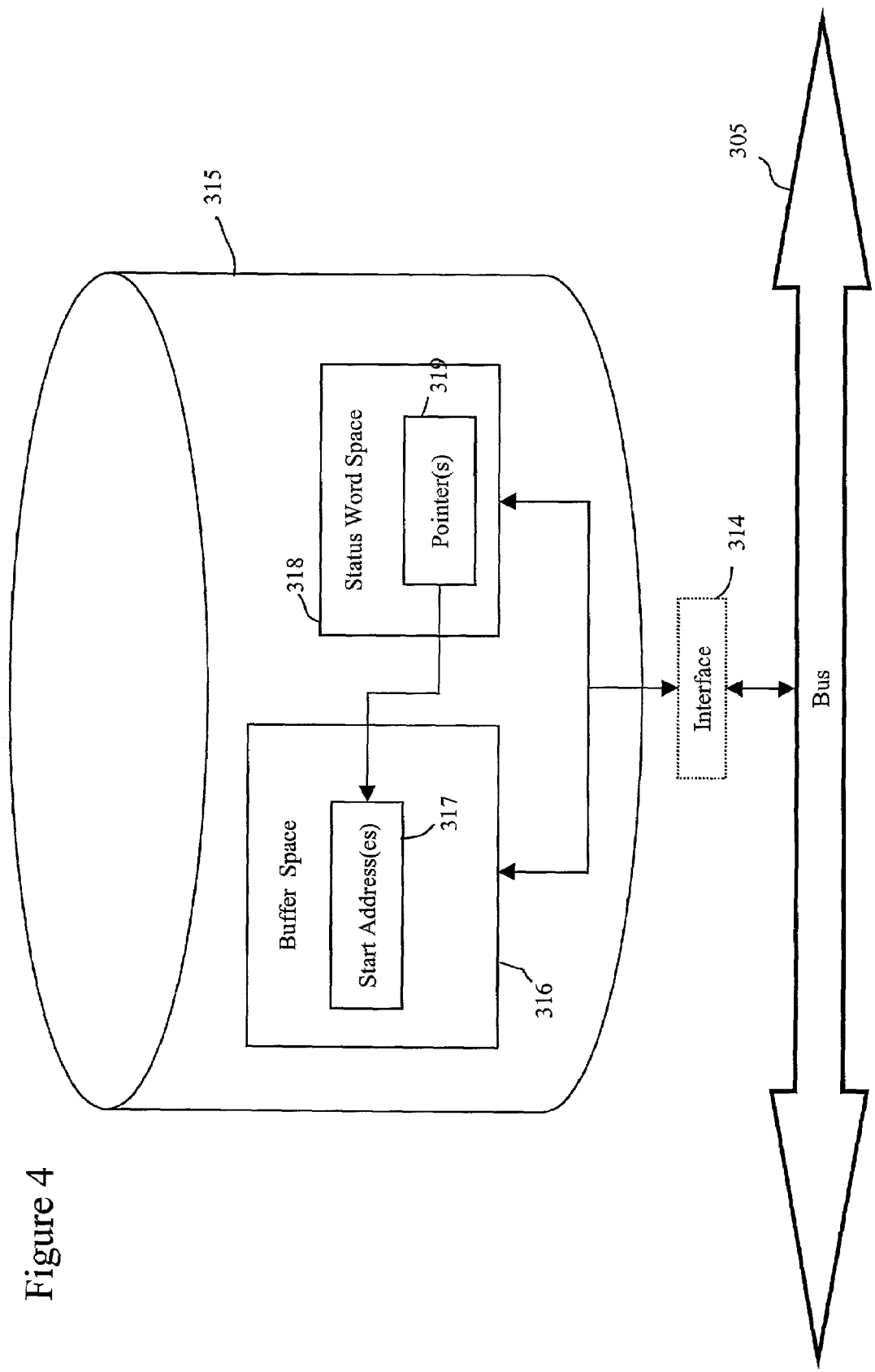
FIG. 4 is a block diagram showing an exemplary construction of a memory device according to an exemplary embodiment of the invention.

FIG. 4 illustrates various components that may be provided for the SDRAM 315. As mentioned above, the SDRAM shown in FIG. 3 is actually a specific implementation of a memory device. It is noted that the invention is not limited to this specific implementation of SDRAM 315 and can include any other known or future developed memory technology. Regardless of the technology selected, the memory device 315 may include a buffer space 316 which may be a fixed or virtual set of memory locations that buffers or otherwise temporarily stores audiovisual data. In practice, the video data may be stored separate from the audio data, but it would be possible to intermix these data types depending upon the particular application and coding techniques utilized for the audio and visual data.

The audio visual data stored in the buffer space 316 includes one or more start addresses 317 which indicate the beginning memory address at which the audio and/or video data (A/V) is stored. If the A/V data is separately stored, then a plurality of stored addresses will be necessary. Furthermore, if there are more than one set of, or a block of data within the buffer space 316, then the start addresses 317 will individually point to each block of data.

The memory device 315 also includes a status word space 318. This status word space includes fixed or virtual addresses at which status words may be stored. An example of a status word that may be stored in the status word space 318 is a status word summarizing the status of a peripheral device. For example, the status word that may be stored within the status word space 318 may include the status of the host processor 310 or transport processor 330. The status word space 318 may also include pointers 319 that point to the start addresses 317 within the buffer space 316.

As further shown in FIG. 4, the SDRAM 315 may connect to the bus 305 via an interface 314. The dash lines indicate that the interface 314 is optional and may or may not be included depending upon the interface requirements of the particular memory device 315 and/or bus 305.

Figure 5:
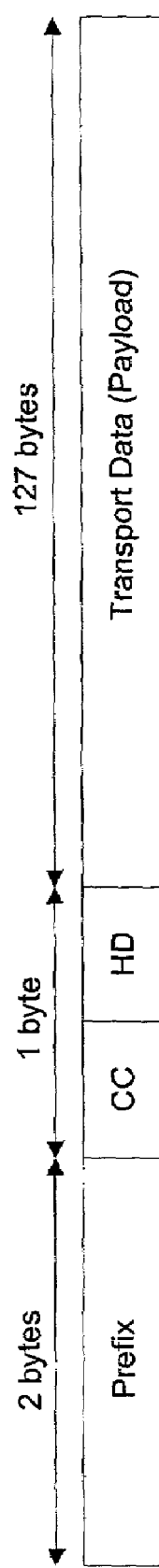
FIG. 5 illustrates the general structure of a DSS transport packet.

Having described the architecture of STB 300 in detail above, the method of the present invention is now described in terms of the structure of a DSS transport packet and in the operation of the STB 300. FIG. 5 illustrates the general structure of a DSS transport packet. As seen in FIG. 5, the DSS transport protocol format defines a 130-byte packet containing a Prefix and Transport Block. The 2-byte Prefix consists of four bits of control information and 12 bits of Service Channel Identification (SCID). The first two bytes of the 130-byte long packet are used for the Prefix, the third byte contains four bits for the Continuity Counter (CC) and four bits for a Header Designator (HD) while the remaining 127 bytes carry the payload.

The transport packet with HD field set to $01X0_b$ carries Basic Video Service (MPEG video data) information. The $HD_1$ bit, indicated by X in $HD=01X0_b$, toggles with each basic video service packet containing a picture start code. For these packets, the picture header start code is packet-aligned to be the first four bytes of the MPEG video data payload following the CC and HD fields. No other packets will toggle the $HD_1$ bit.

Figure 6:
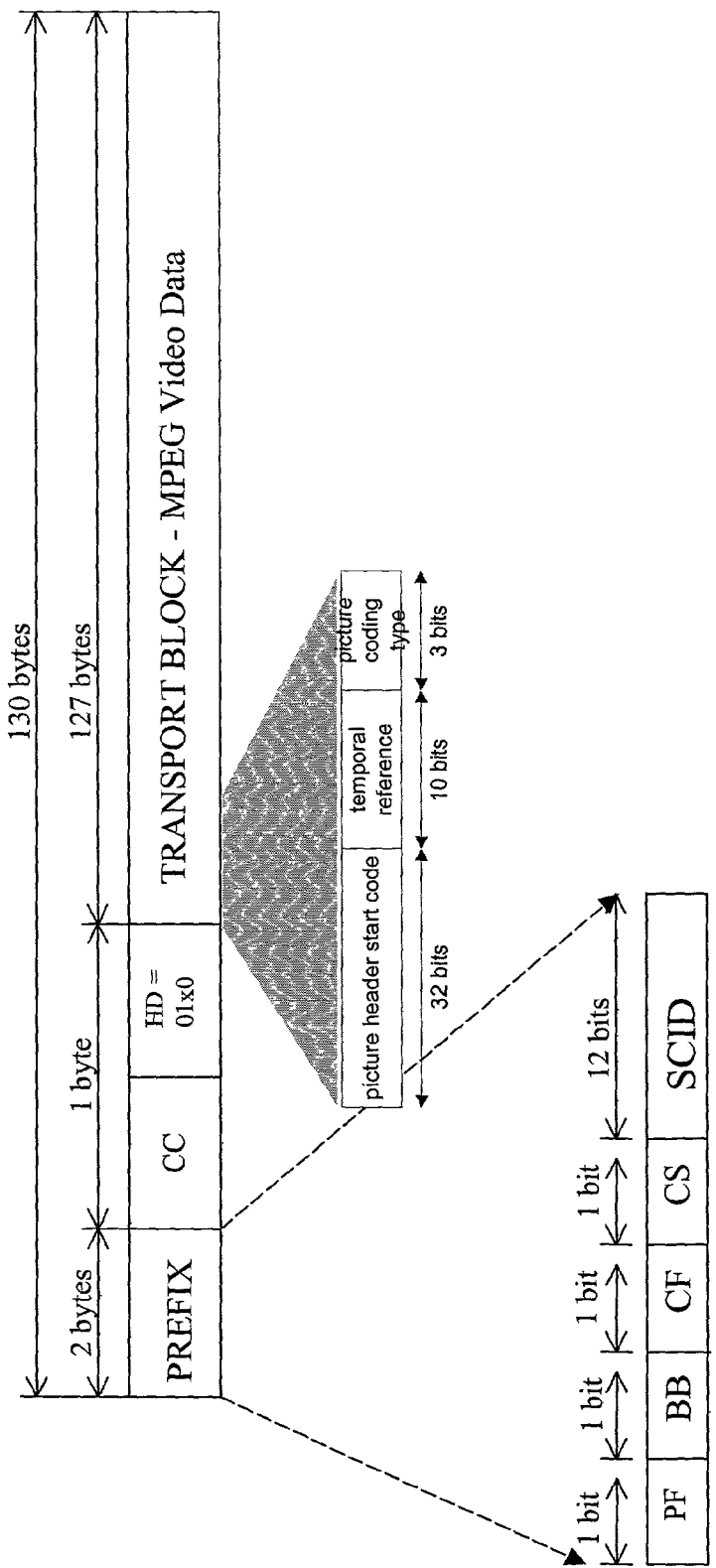
FIG. 6 illustrates the basic video service transport packet structure in accordance with the invention.

FIG. 6 illustrates the basic video service transport packet format in accordance with the invention. All information may be transmitted in this format, including video, audio, program guide, conditional access and other data.

As noted above, each data packet is 130 bytes long (a byte is made up of 8 bits), but seventeen additional bytes (not shown) are used for error correction and/or other functions. The first two bytes of information contain the service channel ID (SCID) and flags. The SCID is a unique 12-bit number that uniquely identifies the particular data stream to which a data packet belongs. The flags are made up of four bits, including bits to indicate whether or not the packet is encrypted and which key (A or B) to use for decryption.

The next, or third byte contains four bits for the Continuity Counter (CC) and Header Designator (HD), while the remaining 127 bytes carry the payload ("transport block"). In general, the Continuity Counter increments once for each packet received with the same SCID value. After CC reaches its maximum value 15 ($1111_b$), the CC wraps to 0 ($0000_b$). The transport block includes the data which is the actual usable information sent from the program provider (MPEG video data for example). Such packets may have less than 127 bytes of useful data.

Further as seen in FIG. 6, the picture start code is a string of 32 bits set to 00 00 01 00$_h$. The temporal reference is a 10-bit unsigned integer associated with each coded picture. The 3-bit picture coding type identifies whether a picture is an intra-coded picture (I), predictive-coded picture (P) or bi-directionally predictive-coded picture (B). The picture coding type is represented by the $11^{th}$, $12^{th}$ and $13^{th}$ bits from the end of the picture start code. In other words, the $43^{rd}$, $44^{th}$ and $45^{th}$ bits of a transport packet payload represent the picture coding type when the first bit of a Header Designator, $HD_1$, toggles in a transport packet.

The following Table 1 explains the types of picture coding, where a picture could be a frame or a field:

TABLE 1

Picture Coding Type

| Picture coding Type (binary) | Coding Method |
| --- | --- |
| 001 | Intra-coded (I) |
| 010 | Predictive-coded (P) |
| 011 | Bi-directionally predictive-coded (B) |

As previously noted, in order to facilitate DVR playback modes, and especially trick modes, the transport packet payload containing the I-picture (frame or field) must be identified and indexed. To do this in an expeditious manner is a function of the present invention.

The transport processor 330 of the present invention is not required to parse and process every transport packet payload to identify the picture coding type. It is sufficient to only parse and evaluate the $43^{rd}$, $44^{th}$ and $45^{th}$ bits of a payload which, as can be seen in FIG. 6, are the three bits after the 32-bit picture header start code and the 10-bit temporal reference of a transport packet payload. This is done only for the transport packet payload being processed when the first bit of a Header Designator (HD) toggles, denoted by X in $HD=01X0_b$ in FIG. 6.

On the other hand, and as currently done, if the transport processor 330 had to evaluate every bit in the transport packet payload to detect the presence of a picture start code (00 00 01 $00_h$), it would be only upon detecting the picture start code that the transport processor could parse and identify the picture coding type.

Figure 7:
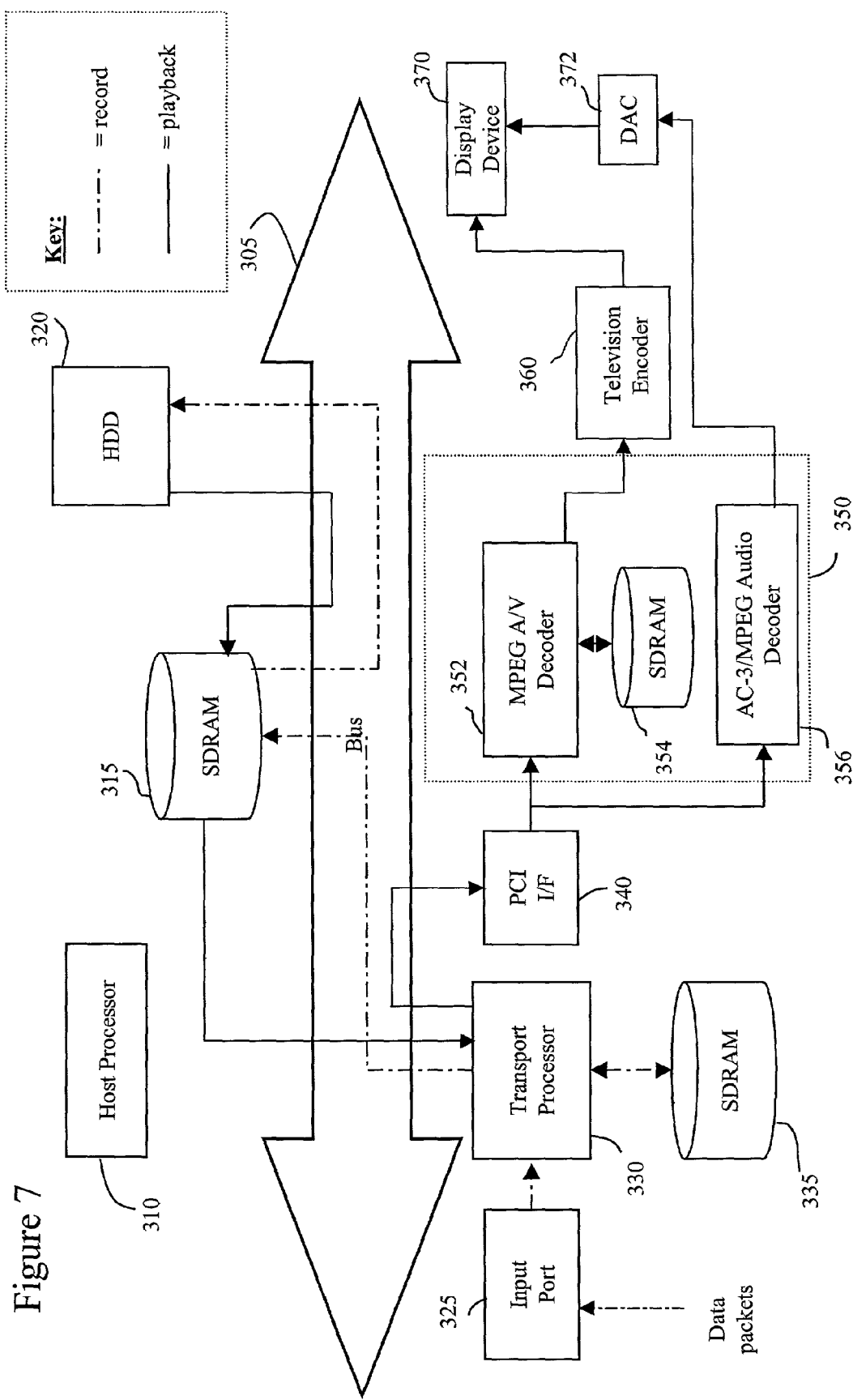
FIG. 7 illustrates a flow diagram showing data flow for a DSS transport packet to describe the method of identifying MPEG picture coding type in accordance with the invention.

FIG. 7 illustrates a flow diagram showing data flow for a DSS transport packet during a recording operation to describe the method of identifying MPEG picture coding type in accordance with the invention. Some of the connections between components, and associated reference numerals from FIG. 3 may have been eliminated in FIG. 7 in order to highlight the data flow, shown using dashed lines (see Key) in FIG. 7.

An exemplary operation of recording received DSS transport packets of data in STB 300 will now be described. When the STB 300 is in a power-down mode, namely a viewer is not watching programming on the display device 370, the host processor 310 searches a program guide therein to find an upcoming event, which could be any of a broadcast program or pay-per-view event (PPV), for example, to ultimately record on HDD 320. When the event begins, the STB 300 tunes to the appropriate transponder and begins receiving the A/V data, system time and conditional access packets associated with the event (this is the DSS transport packet payload shown in FIG. 6).

As shown in FIG. 7, the DSS transport packets are received by input port 325 and fed to the transport processor 330. At this point, and if desired, the programming data (which is received as compressed and encrypted data as explained above) may also be subjected to an additional layer of content protection provided by transport processor 330.

At the point where the first bit of the header designator $(HD_1)$ toggles, the transport processor 330 parses and evaluates the corresponding DSS transport packet payload at the $43^{rd}$ to 45 bits to identify the picture coding type based on the above-noted table, which is stored in SDRAM 335.

Figure 8:
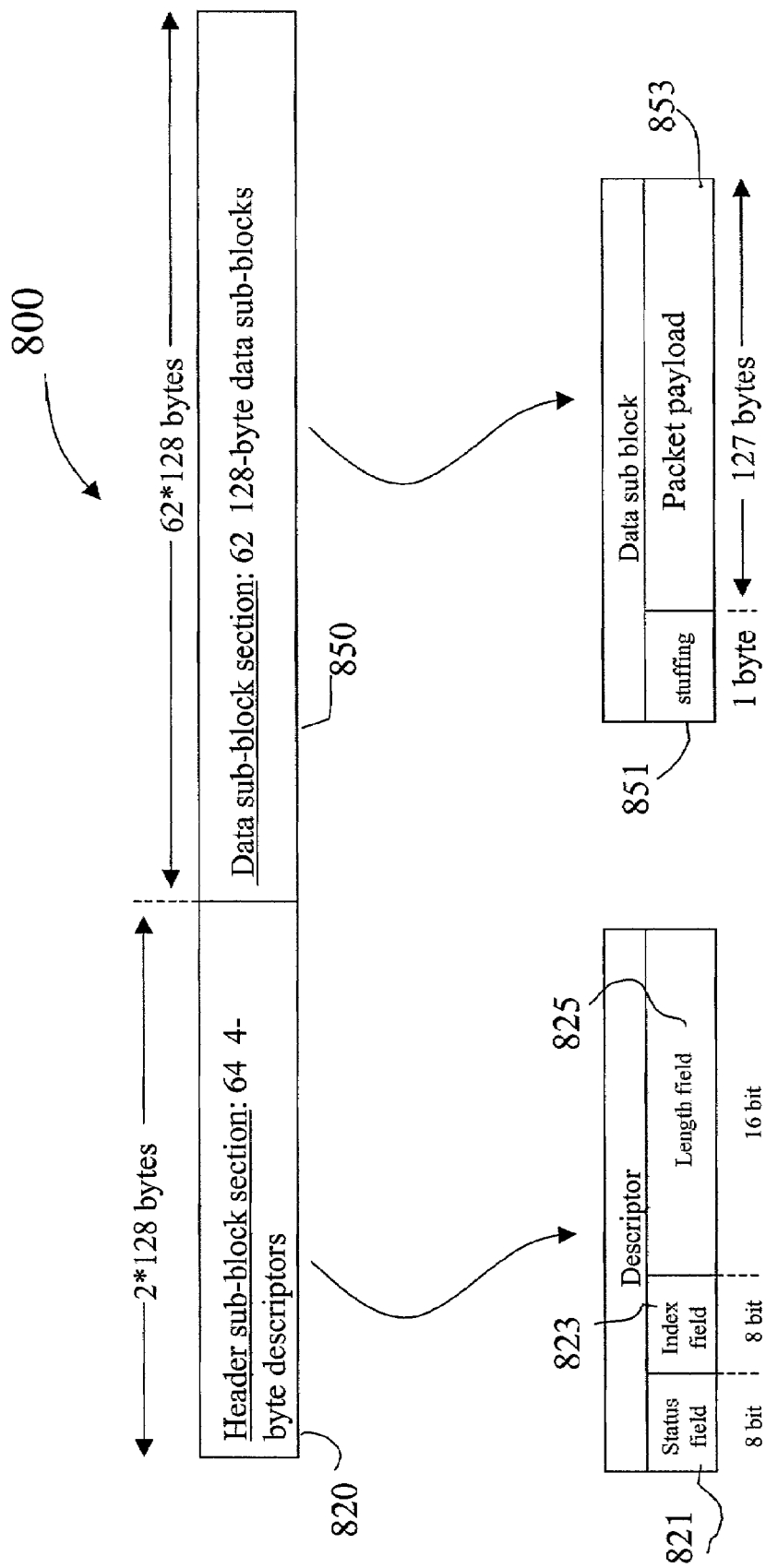
FIG. 8 illustrates an exemplary transport block that accumulates in buffers of the transport processor 330 in accordance with the invention.

FIG. 8 illustrates an exemplary transport block that accumulates in buffers of the transport processor 330 in accordance with the invention. The transport processor 330 accumulates MPEG video and audio data contained in the transport packet payloads as blocks 800 in fixed-size buffers. As an example, the buffer size could be 8 kilobytes. Each block 800 is made up of sub-blocks; a header sub-block 820 and data sub-blocks 850 as depicted in FIG. 8. As one of its functions, the transport processor 330 is responsible for generating the header sub-block 820. The header sub-block 820 may be defined to be 2*128 bytes long. It may contain up to 64 4-byte descriptors. Only 62 of the 64 descriptors are used since there are only 62 128-byte data sub-blocks 820.

As shown in FIG. 8, each descriptor may consist of a status field 821 (8 bits), index field 823 (8 bits), and length field 825 (16 bits). Additionally, each 128-byte data sub-block 850 contains a stuffing byte 851 followed by a 127-byte transport packet payload 853.

The 8-bit status field 821 contains information about the payload in a data sub-block 850 (i.e. empty sub-block, video, audio1, audio2, I-picture exists, etc). The status field 821 indicates the picture coding type. When the header sub-block 820 is not fully utilized, a dummy sub-block type called empty sub-block may be used and the rest of the header information may be ignored. There are 62*128 bytes available for data sub-block 850, since 2*128 bytes are allocated for sub-block headers 820. The 62 headers in the header sub-block correspond to 248 bytes. As a consequence, the final 8 bytes of the Header sub-block contain reserved bits (FF FF FF FF FF FF FF $FF_h$). The following Table 2 summarizes typical status field payload information:

TABLE 2

Status Field Description

| Status Byte (hex) | Description |
| --- | --- |
| 00 | Audio 1 |
| 01 | I-picture |
| 02 | New I-picture |
| 03 | P-picture |
| 04 | New P-picture |
| 05 | B-picture |
| 06 | New B-picture |

The 8-bit index field 823 represents the offset to the data sub-block 850 of interest. The $i^{th}$ index corresponds to the starting location of the $i^{th}$ data sub-block 850. The starting location is index*128 bytes. The index field allows an immediate jump to the starting location of an I-picture without having to process all the previous descriptors. An 8-bit index field 823 may facilitate a 128*128 byte or 16yte block. The 16-bit length field 825 determines the length of a data sub-block 850. The starting location of each data sub-block 850 is always a multiple of 4 bytes. In other words, a data sub-block 850 is double-word aligned.

The transport processor 330 then transfers the received programming data, including the identified MPEG picture coding types of each 8-kilobyte buffer, to SDRAM 315. Here, host processor 310 parses the header sub-block 820 of each of the received buffers to locate all of the I-pictures. The host processor 310 then creates an I-picture Table. The I-picture Table links together the individual I-pictures that make up the MPEG video program. The format of an I-Picture Table is shown below in Table 3:

TABLE 3

| HDD Start Sector | Offset to Start of I-Picture | Offset of End of I-Picture |
| --- | --- | --- |

The entries of Table 3 list the location of the I-pictures to the location on HDD 320. The host processor 310 needs to know where all the I-pictures are, since for playback and especially for any trick mode, the leading I-picture in a GOP is to be identified and decompressed first for eventual display at display 370. Any P-pictures and B-pictures following the I-picture in a GOP cannot be successfully decoded prior to decoding the leading I-picture. Since these I-pictures have been located in advance (i.e., during the initial recording operation), there is no delay in subsequently implementing a particular trick mode of operation.

Digital recording is accomplished by the host processor 310, which transfers the programming data buffered by SDRAM 315 to the HDD 320. In other words, the SDRAM 315 serves as a buffer that buffers data sent by transport processor 330. This allows the host processor 310 to control the recording onto the HDD 320 when time is available. When a sufficient amount of programming data has been accumulated in the SDRAM 315, the host processor 310 transfers the data from the SDRAM 315 to the HDD 320 for recording therein.

The operation of playing back the recorded programming data in STB 300 is now described. Referring again to FIG. 7, when the viewer turns the STB 300 back on, the viewer is given the option to playback any of the previously recorded events. Preferably, this may be done by using remote control (not shown) to access a menu on display device 370. If the viewer selects an event, the corresponding audio, video, system time and conditional access packets (i.e., the selected DSS transport packets of programming data) are retrieved from HDD 320.

In particular, when the user selects the playback option, the selected programming data recorded on HDD 320 is sent via bus 305 to a queue in SDRAM 315. Next, the buffered data is sent from SDRAM 315 via bus 305 to PCI I/F 340, which in turn sends the selected programming data to decoder 350. More specifically, the video portion of the bitstream is sent to MPEG A/V decoder 352, with the audio portion being sent to AC-3/MPEG audio decoder 356. Alternatively, MPEG encoded audio and video data are sent to MPEG A/V decoder 352 while Dolby Digital AC-3 data, if exists, is sent to AC-3 audio decoder 356.

In particular, since little processing power was wasted in parsing and evaluating the DSS transport packet payloads to detect and identify MPEG picture coding types, a greater amount of processing power at transport processor 330 is available to perform encryption. Due to the potential for perfect digital copies of audiovisual contents, content protection is preferably required. Content protection minimizes, if not prevents, the ability for one to illegally read video data directly from the HDD 320. Data may be encrypted in such a way that it cannot be used to facilitate a valid playback signal without a proper decryption. Thus, the video signal cannot be properly decoded and appears garbled without proper decryption. There are various types of encryption algorithms that would be suitable in the present invention, such as Data Encryption Standard (DES), RIJNDAEL, etc. or any other known or conventionally used encryption algorithms in the art.

Additionally, MPEG A/V decoder 352 may be provided with an SDRAM 354 in order to more efficiently decode the MPEG bitstream (i.e. now-decrypted but still encoded video portion of the programming data) received from PCI I/F 340. SDRAM 354 is similar to SDRAM 315 discussed above in its construction. SDRAM 354 temporarily holds the encoded video bitstream data, and also provides the three picture buffers required for MPEG decoding, as is known in the art. Thereafter, the decoded programming data (A/V data) is output to NTSC encoder 360 for conversion to an analog format, so that it may be displayed on display device 370. From this point on, the playback data looks, for all intents and purposes, identical to the original broadcast.

As described above, the method of the present invention makes it possible to efficiently identify the MPEG picture coding types of a received broadcast or event that is to be recorded without parsing and evaluating every DSS transport packet. The method enables processing power to be conserved by only parsing that DSS transport packet payload that corresponds to a toggling of a header designator. In one aspect, this is significant in that the transport processor 330 is provided with more processing power to handling the real-time encrypting and decrypting of data packets received by STB 300. In another aspect, since the I-pictures are detected and flagged initially, during the recording phase, trick mode operation is facilitated as the host processor 310 knows the location of the various I-pictures in a sequence, which are to be decompressed during the particular trick mode operation/playback.

The invention being thus described, it will be obvious that the same may be varied in many ways. The above-described method has been described as comprised of several components, flowcharts or blocks, it should be understood that the method may be implemented in application specific integrated circuits, software-driven processor circuitry, or other arrangements of discrete components. Such variations are not to be regarded as a departure from the spirit and scope of the invention, and all such modifications as would be obvious to one skilled in the art are intended to be included within the scope of the following claims.

What is claimed is:

1. A method of identifying MPEG picture coding types of pictures in a digital recording system, comprising: receiving a plurality of packets having audiovisual and information data therein; parsing a payload portion of a particular one of said plurality of received packets to identify the picture coding type in the payload portion.

2. The method of claim 1, wherein said parsing is performed on a packet only if a first bit of a header designator of that packet toggles.

3. The method of claim 1, wherein a picture is a frame or a field.

4. The method of claim 1 wherein the detected picture coding type is compared to stored codes representing intra-coded (I), predictive-coded (P), and bi-directionally predictive-coded (B) picture types.

5. The method of claim 1, wherein said steps of receiving, parsing and identifying are performed during a recording of an incoming broadcast or event.

6. The method of claim 5, further comprising: indexing the identified picture coding types, the indexed I-pictures representing flags so as to be located and decompressed in a subsequent playback of, or trick mode operation performed on, the recorded broadcast or event; and forwarding said indexed picture types together with the processed packet payloads to a central processor for eventual storage in the recording system.

7. The method of claim 2, wherein the length of said packets is 130 bytes, said parsing being performed only at the 43$^{rd}$ to 45$^{th}$ bytes of the particular packet with the toggling header designator.

8. The method of claim 1, wherein the presence of an MPEG picture start code in the payload portion is indicated by toggling of a bit in a header designator portion of said particular one received packet.

9. A transport processor for identifying MPEG picture coding types of pictures in a digital video recording (DVR) system, comprising: means for receiving a plurality of packets having audiovisual and information data therein; means for parsing a payload portion of a particular one of said plurality of received packets to identify the picture coding type in the payload portion.

10. The transport processor of claim 9, wherein said means for receiving, means for parsing and means for identifying are embodied as any of application specific integrated circuits (ASIC) with on-chip instruction cache and data cache memory, and integrated system peripherals.

11. The transport processor of claim 10, wherein said integrated system peripherals represent interrupt, timer, and memory controllers on-chip, including ROM, SDRAM, DMA controllers, packet processors, a crypto-logic unit, a PCI compliant PC port, and parallel inputs and outputs.

12. The transport processor of claim 9, wherein a picture is a frame or a field.

13. The transport processor of claim 9, wherein the transport processor compares the detected picture coding type to stored codes representing intra-coded (I), predictive-coded (P), and bi-directionally predictive-coded (B) picture types, said stored codes provided in an SDRAM operatively connected to the transport processor.

14. The transport processor of claim 9, wherein said transport processor performs said steps of receiving, parsing and identifying as the DVR system records an incoming broadcast or event.

15. The transport processor of claim 9, wherein the transport processor further indexes the identified picture coding types and stores them in an SDRAM, the indexed I-pictures representing flags so as to be located and decompressed in a subsequent playback of, or trick mode operation performed on, the recorded broadcast or event; the transport processor further including: means for forwarding said stored indexed picture types together with the processed packet payloads to a central processor for eventual storage in a mass storage device of the DVR system.

16. The transport processor of claim 9, wherein length of said packets is 130 bytes, said transport processor parsing a packet only at the 43rd to 45th bytes of the particular packet having the toggling header designator.

17. The transport processor of claim 9, wherein the presence of an MPEG picture start code in the payload portion is indicated by toggling of a bit in a header designator portion of said particular one received packet.

18. A set top box (STB) for identifying MPEG picture coding types of a received broadcast or event, comprising: a transport processor operatively connected to a bus and to one or more input ports for receiving a plurality of packets of audiovisual and information data representing said broadcast or event from said input port; a host processor operatively connected to said bus and interacting with the transport processor to process the received packets; and a recording device for digitally recording said received packets for later playback, wherein said transport processor parses a payload portion of a particular one of said plurality of received packets to identify the picture coding type in the payload portion.

19. The STB of claim 18, wherein said transport processor parses a packet only if a first bit of a header designator of that packet toggles.

20. The STB of claim 18, wherein a picture is a frame or a field.

21. The STB of claim 18, wherein the detected picture coding type is compared to stored codes representing intra-coded (I), predictive-coded (P), and bi-directionally predictive-coded (B) picture types, said codes stored in an SDRAM operatively connected to the transport processor.

22. The STB of claim 18, wherein the parsing and identifying of picture types is performed as the STB records the incoming broadcast or event.

23. The STB of claim 21, wherein the transport processor indexes the identified picture coding types, the indexed I-pictures representing flags so as to be located and decompressed in a subsequent playback of, or trick mode operation performed on, the recorded broadcast or event, and wherein the indexed picture types together with the processed packet payloads are forwarded to the host processor that identified the I-pictures to be decompressed and then stores the processed packet payloads in the mass storage device of the STB.

24. The STB of claim 23, wherein the mass storage device is any of a magnetic storage device, an optical storage device, or a hard disk drive.

25. The STB of claim 18, wherein length of said packets is 130 bytes, said transport processor parsing a packet only at the 43$^{rd}$ to 45$^{th}$ bytes of the particular packet having the toggling header designator.

26. The STB of claim 18, wherein the presence of an MPEG picture start code in the payload portion is indicated by the toggling of a bit in a header designator particular one received packet.

* * * * *